Figure 1:
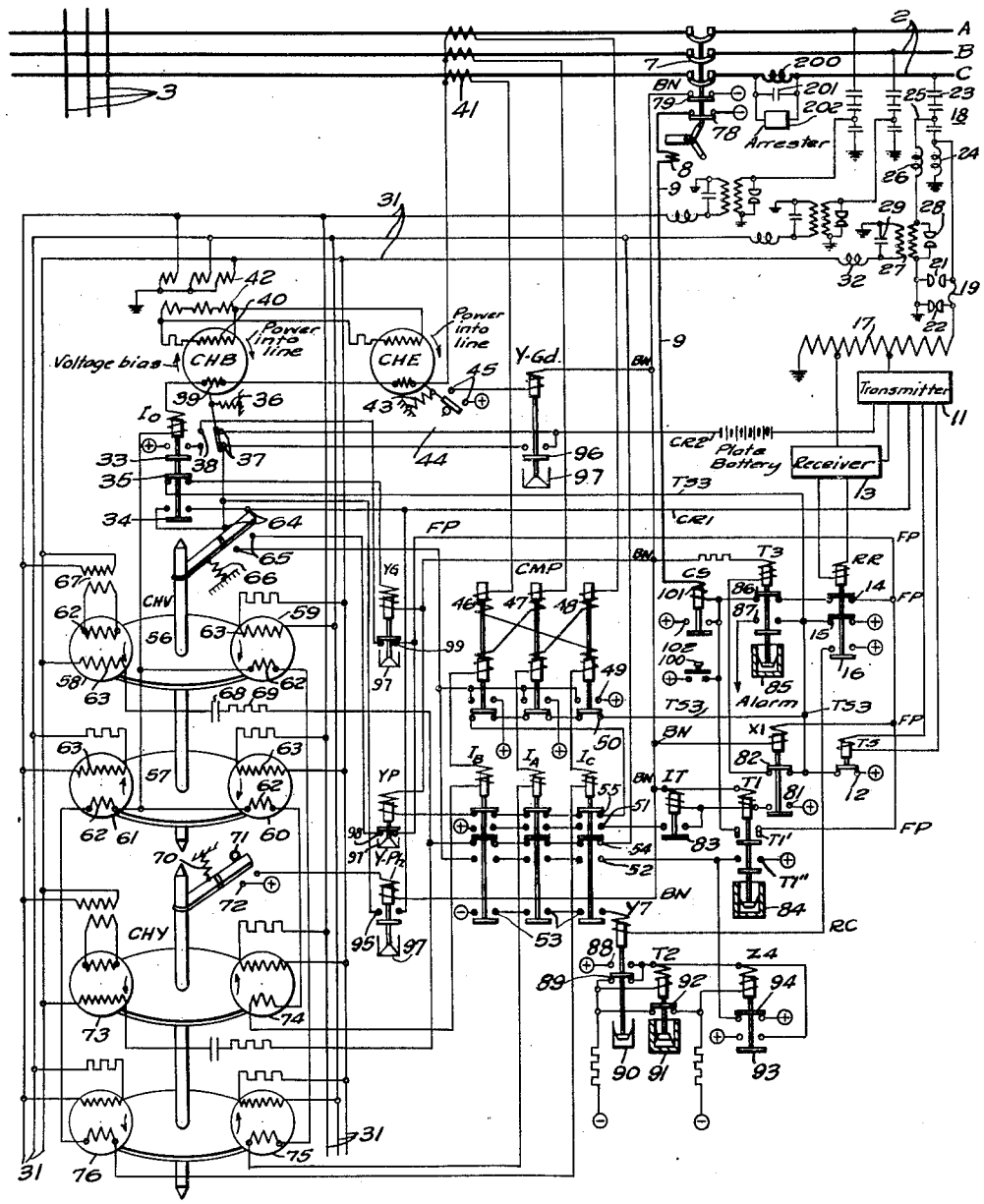

June 18, 1935.  L. B. LE VESCONTE  2,004,955
CONTINUOUS CARRIER RELAYING
Filed Dec. 22, 1933  4 Sheets-Sheet 1

WITNESS
E. A. McCloskey

INVENTOR
Lester B. Le Vesconte.
BY O. B. Buchanan
ATTORNEY

June 18, 1935.  L. B. LE VESCONTE  2,004,955
CONTINUOUS CARRIER RELAYING
Filed Dec. 22, 1933  4 Sheets-Sheet 2

INVENTOR
Lester B. Le Vesconte.
BY O. B. Buchanan
ATTORNEY

Patented June 18, 1935

2,004,955

UNITED STATES PATENT OFFICE 2,004,955

CONTINUOUS CARRIER RELAYING

Lester B. Le Vesconte, Irwin, Pa., assignor to Westinghouse Electric & Manufacturing Company, East Pittsburgh, Pa., a corporation of Pennsylvania Application December 22, 1933, Serial No. 703,611

16 Claims. (Cl. 175—294)

This invention relates to means for making the continuous carrier relaying system for transmission-line protection practical, and it has particular relation to means for preventing faulty operation after carrier-current has been removed from a line-section as a result of low delta-phase voltage or high residual voltage accompanied, in either case, by low current.

The expression "continuous carrier relaying" is used in contradistinction to "intermittent carrier relaying", an example of which is shown in Fig. 8 of the Scott Patent 1,765,887, patented June 24, 1930. In the continuous carrier relaying system, the carrier-current is left on the line at all times except when there is a fault in the line-section being protected, at which time the carrier-current must be removed from both ends of the line-section in order to permit instantaneous tripping. In the intermittent carrier relaying system, there is normally no carrier-current superimposed on the line, but in the event of a fault accompanied by power-flow from the line to the bus at either end, carrier-current is suddenly superimposed on the line for the purpose of preventing tripping at the other end, the tripping relays being given a suitable time-hesitation or sluggishness of action, of about three cycles, in order to give the carrier-current relays time to inhibit the tripping action if the fault is not in the line-section being protected. Both relaying systems utilize, or may utilize, carrier-current transmitters of the same frequency at each end of the line-section being protected.

Heretofore, one of the principal objections against the continuous carrier system, which has helped to lend weight to the intermittent carrier system in spite of the inherent time-hesitation necessarily introduced in every operation of the latter, has been the circumstance that it is possible for transmission system to be so operated, at times, that there is no adequate source of voltage for supplying power to one end of the line section to be protected, in which case, there will be insufficient fault-current to properly actuate the directional relays at that end, so as to remove the carrier current from that end of the line. This condition of operation of a transmission system may be brought about by a disconnection in the transmission line at some point possibly several sections removed from the section being protected, and this disconnection may be made in either a multi-circuit transmission system or in a loop system.

In order to overcome this difficulty, therefore, it has been necessary to introduce means for removing the carrier-current from the line, in a continuous carrier-relaying system, whenever there is a voltage-indication of fault, unaccompanied by fault-current, and such means constitutes the subject matter of an application of William A. Lewis, Serial No. 703,607, filed December 22, 1933, for Continuous carrier relaying.

It is possible, in either a parallel-circuit system or a loop system, for a fault to occur near the middle of one of two parallel line-sections, or near the middle of the portion of a loop which parallels a particular line-section, so that practically no fault-current will flow through the sound line-section under consideration. As just previously pointed out, it is, or seems to be, essential, because of the possibility of single-source operation, in a continuous carrier relaying system, to design the protective equipment so that the carrier is removed when there is a voltage indication of the existence of a fault, unaccompanied by a current-flow of fault-magnitude. Hence, under conditions where a fault occurs in the middle of a parallel line-section or loop, in a continuous carrier relaying system, it will result that such a fault will produce a voltage indication of fault in the sound line-section, unaccompanied by fault current, so that carrier-current will be removed from both ends of the sound line-section.

During the process of clearing the fault in the other line-section where it is located, it will be almost inevitable that the circuit breaker on one side of the fault will cease arcing before the other circuit breaker, or that one pole of one of the circuit breakers will cease arcing first, thereby disconnecting or partially disconnecting one end of the faulty line-section, resulting in a sudden rush of current of fault-magnitude in the sound line. Since carrier-current has been removed from the sound line, this sudden rush of fault current would cause instantaneous faulty tripping of the sound line unless means were adopted for preventing the tripping function from being effected, under such circumstances, faster than is required for carrier-current to be restored to the sound line and for the carrier-current relays to respond to such restoration of carrier.

However, the very reason for going to the expense of a carrier-current installation is to secure an extremely quick fault-responsive relay-indication, and this is all the more desirable in modern systems utilizing quick clearing of faults with circuit breakers as fast as three cycles or less in their total operating time from the moment of energization of the trip-coil to the interruption of the arc.

It is the object of my invention, therefore, to provide a means, system and method, for overcoming the aforementioned difficulty without introducing any time-hesitation or delay in any legitimate tripping function or operation of the relaying equipment. In brief, my invention consists in the utilization of means which will introduce the necessary time-hesitation or delay in response to a voltage indication of fault unaccompanied by fault-current, but which will not introduce any time-hesitation or delay under any other conditions. I have thus removed, so far as can be at present determined, the last possible obstacle or objection against the use of the continuous carrier system as distinguished from the intermittent carrier system previously mentioned.

Figure 2:
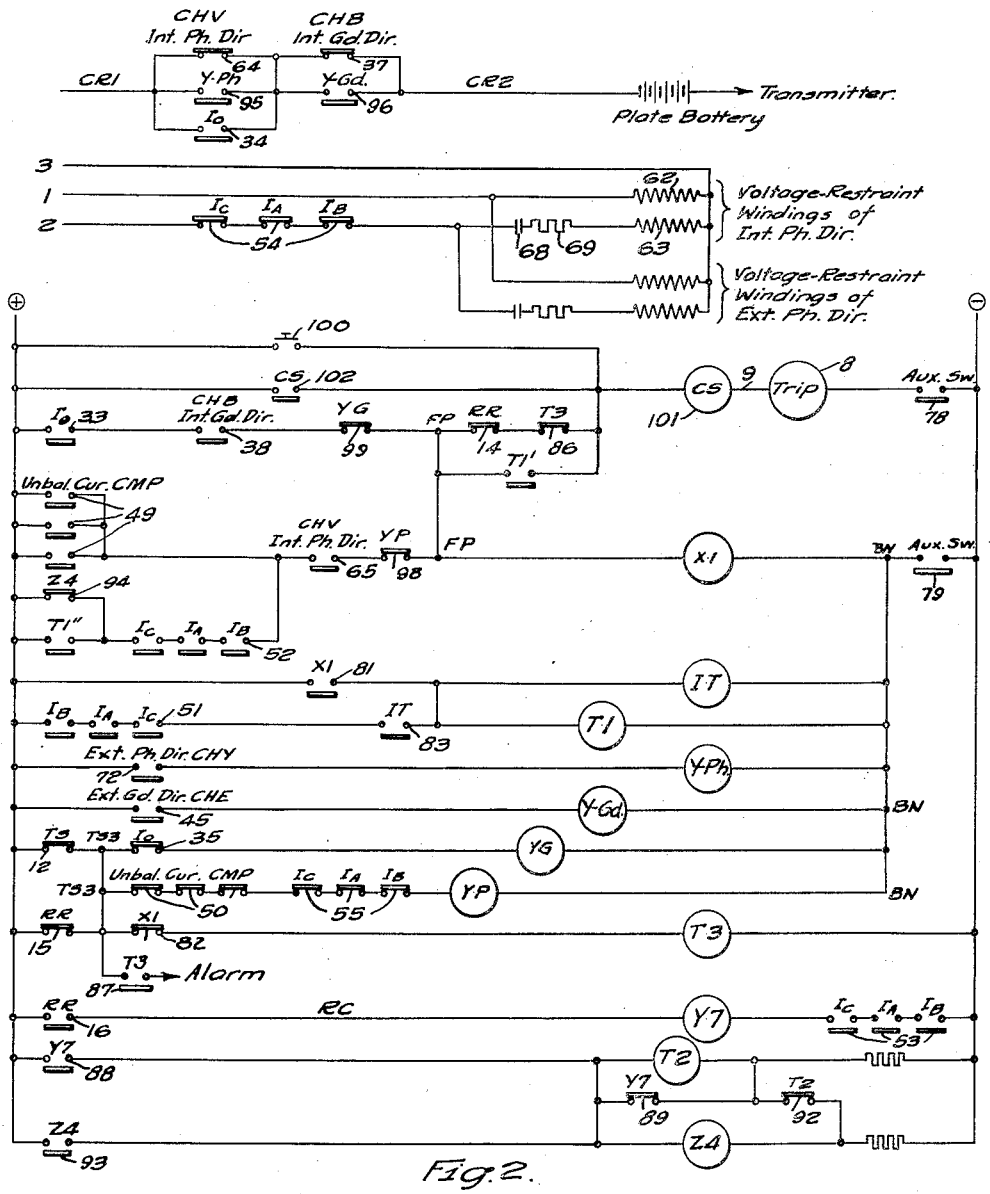
Figure 3:
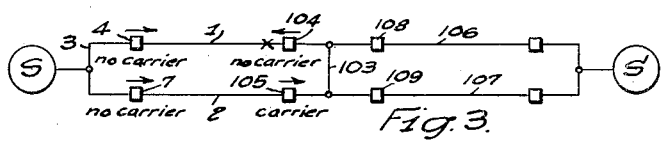
Figure 4:
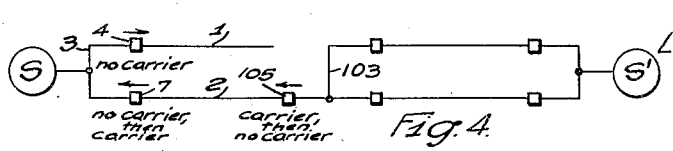
Figure 5:
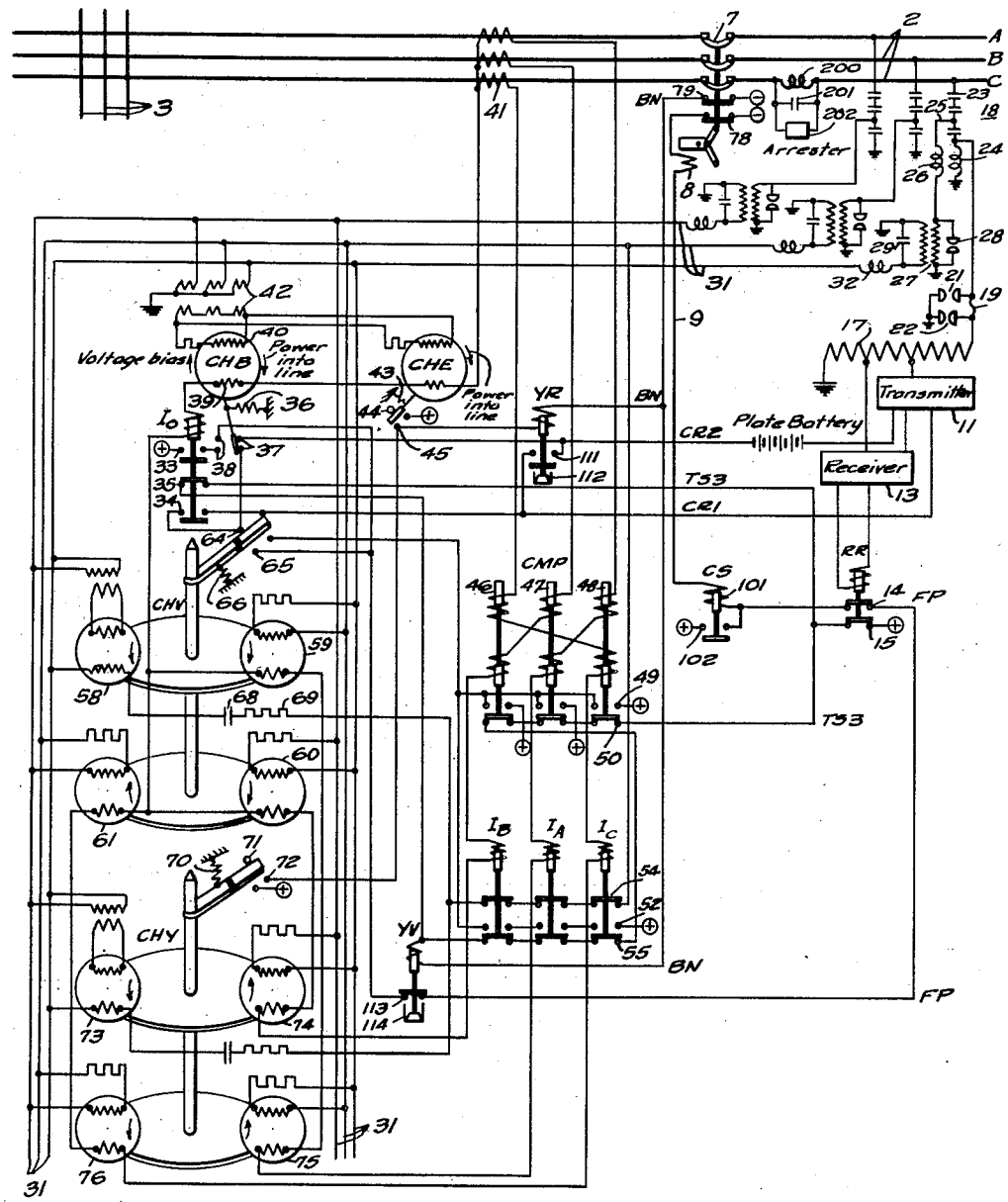
Figure 6:
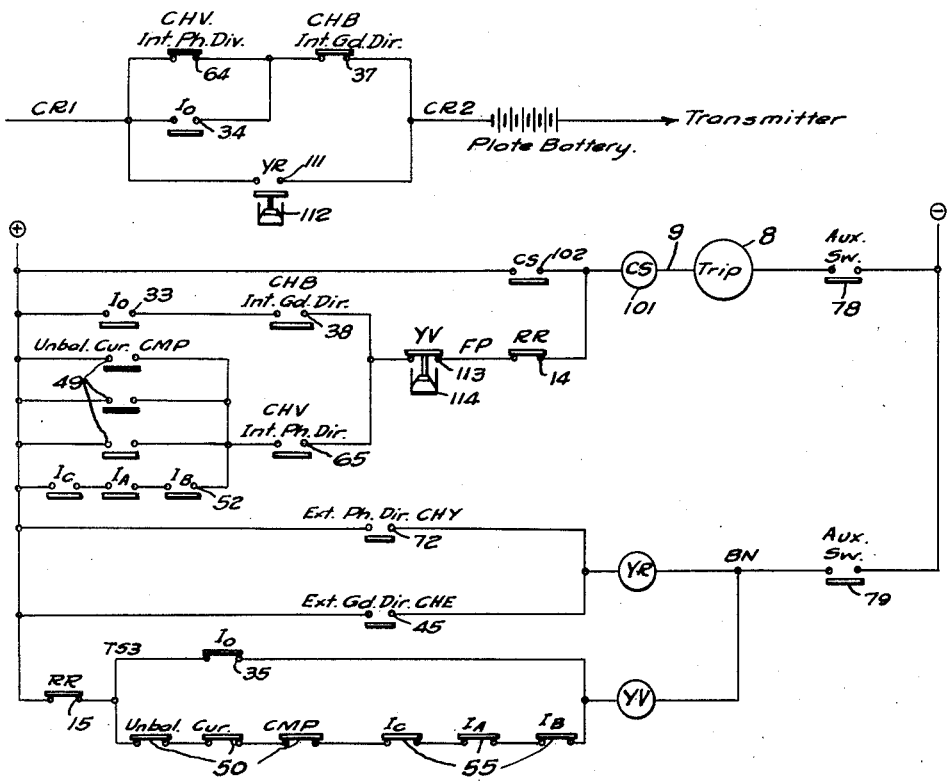

With the foregoing and other objects in view, my invention consists in the systems, combinations, apparatus and methods hereinafter described and claimed, and shown in the accompanying drawings, wherein Figure 1 is a diagrammatic view of circuits and apparatus embodying my invention in an illustrative form;

Fig. 2 is a corresponding schematic or across-the-line diagram of the same system;

Figs. 3 and 4 are single-line diagrams referred to in the explanation of the operation; and Figs. 5 and 6 are views similar to Figs. 1 and 2, showing a modification.

My invention is illustrated as applied to one end of a line-section 2 of a three-phase synchronous transmission system, the illustrated end of the protected section 2 being connected to the bus 3. As the relaying equipment for each end of the protected section is identical, one illustration and description will suffice for both ends.

The line 2 is provided with a circuit breaker 7 having a trip coil 8 and a trip-circuit conductor 9, the control of which embodies the means forming the subject matter of the present invention.

The line 2 has superposed thereon carrier currents of relatively high frequency, as a means for securing instantaneous tripping for all faults in the line-section to be protected. This carrier current is produced, at each end of the line-section, in a transmitter 11 which is indicated schematically by a rectangle, as the details of it are not necessary to an understanding of the present invention. It may be a transmitter similar to that which is shown in the application of William A. Lewis and Robert D. Evans, Serial No. 660,342, filed March 11, 1933, for Protective relay systems. The transmitter is provided with a plate circuit CR1—CR2, the opening of which instantly interrupts the transmission. The transmitter is also provided with a transmitter supervisory relay TS having back- or break-contacts 12 which are broken when the relay is energized and made when the relay is deenergized, as described and claimed in the Lewis and Evans application just mentioned.

The carrier-current equipment at each end of the line 2 also includes a receiver 13 which is indicated only schematically, but it may be substantially as shown and described in the aforementioned Lewis and Evans application. The receiver 13 serves to energize a receiver relay RR having two back- or break-contacts 14 and 15 and one front- or make-contact 16, the break-contacts 14 and 15 being opened when the receiver relay RR is energized, and the make-contact 16 being closed when the receiver relay RR is energized.

The transmitter and receiver 11 and 13 are coupled to phase-conductor C of the transmission line 2 by means of tap connections on an inductor or auto-transformer 17, and a combined coupling capacitor and capacitor-potentionmeter designated in its entirety by the numeral 18, which constitutes the subject-matter of an application of Paul O. Langguth and William A. Lewis, Serial No. 603,608, filed December 22, 1933, for a Coupling capacitor system.

Interposed between the inductor 17 and the coupling device 18 is a fuse 19, the terminals of which are connected to ground through gap devices 21 and 22. Gap 22, which is connected to the terminal of the inductor 17, is set closer than gap 21 so that, in case a high voltage should reach the coupling lead, the gap 22 would discharge first and divert the surge to ground. In case of power current following the discharge, the rush of current through the fuse 19 to this gap 22 would blow the fuse. Upon the blowing of the fuse 19 the voltage across the other gap 21 would then rise to a value sufficient to discharge this other gap, thus permitting the fuse to clear, and isolating the carrier-current equipment. The arc across the gap 21 may continue until it is cleared by the circuit breakers at the ends of the line.

The carrier-current equipment is illustrated as being connected from the phase-C conductor of the line, to ground.

The coupling-capacitor equipment includes a string of capacitors 23 which are connected between the phase-C conductor and a drain coil 24, the other terminal of which is grounded, the carrier-frequency coupling connection being made between the drain coil and the last capacitor unit of the string 23. The same capacitor string is utilized as a capacitor-potentiometer which is tapped off at an intermediate point 25, from which a circuit is lead through a choke coil 26 to a potential transformer 27 which is protected by a gap device 28. The secondary circuit of the potential transformer is, or may be, shunted by a capacitor 29 which aids in the adjustment of the secondary voltage and also improves the voltage regulation of the device.

It will be understood that all three phases of the line 2 are provided with capacitor voltage equipments 18 similar to that just described for phase C, except that the carrier-current connection is utilized only in phase C. By this means, potential is supplied for a three-phase relaying-voltage line 31, the three conductors of which are connected to the respective secondary circuits of the potential transformers 27 through inductors 32, respectively, which provide tuned relaying-voltage circuits so as to compensate for the phase-angle displacement across the capacitor unit or units between the intermediate tap 25 and ground.

The relaying equipment utilized in the system illustrated comprises the following elements.

*An instantaneous ground overcurrent relay Io.*—This relay has two make-contacts 33 and 34 and one break-contact 35.

*An instantaneous internal-fault ground directional relay CHB.*—This may be either of the induction-disc type or of the galvanometer type, the latter constituting the subject-matter of a Goldsborough Patent 1,934,664, patented November 7, 1933. This ground directional relay is provided with two torques, both tending to operate the relay against the pull of a light restraining spring 36. One torque is a voltage-bias torque produced by voltage alone, and the other torque is a power-directional torque produced by the product of ground current and residual voltage multiplied by the sine of some predetermined angle plus the angle existing between the ground current and the residual voltage. The voltage torque is strong enough to actuate the relay when the residual voltage exceeds a predetermined value, but it is not so strong that it will overcome the directional torque whenever a current exceeding the minimum operating point of the overcurrent element Io is flowing in the reverse direction. The ground directional element CHB is provided with one break-contact 37 and one make-contact 38. It is provided with a current winding 39 and a voltage winding 40, which are energized, respectively, from the neutral circuit of a set of line-current transformers 41, and from a residual potential transformer 42.

*An instantaneous external-fault ground directional relay CHE.*—This may be of the same type as the internal ground directional relay CHB, except that it has no voltage bias, and except that its power-directional torque, which actuates the relay against the restraining power of its spring 43, is responsive to a direction of power-flow from the line into the bus. Its moving element is normally held against a back-stop 44 by means of the restraining spring 43. It is provided with one front or make-contact 45.

*An instantaneous unbalanced-current relay CMP.*—This relay consists of three mechanically independent elements 46, 47 and 48 each having a current-responsive actuating coil and a current-responsive restraining coil, so that each element responds to the difference between two of the line-currents supplied by the current transformers 41. Each of the three elements of the instantaneous unbalanced-current relay CMP has one make-contact 49 and one break-contact 50.

*Three instantaneous phase-overcurrent relays $I_A$, $I_B$ and $I_C$.*—These are energized from the respective line-currents as supplied by the current transformers 41. Each of these relays has three make-contacts 51, 52 and 53, respectively, and two break-contacts 54 and 55, respectively.

*An instantaneous internal-fault phase directional relay CHV.*—This relay is composed of four torque-producing elements mechanically coupled together, so that the torques add algebraically. Each torque-producing element may be of either the induction-disc type or the galvanometer type, as previously explained in connection with the ground directional relay CHB. For convenience of illustration, the internal phase directional relay CHV is shown as comprising two discs 56 and 57 which are operated on by four magnetic elements 58, 59, 60 and 61 of a common watt-meter type, each comprising a heavy current-winding 62 and a voltage-winding 63. The internal phase directional relay CHV is provided with break-contacts 64 and make-contacts 65, and it is also provided with a light actuating spring 66 which tends to actuate the relay into a position in which the break-contacts 64 are opened and the make-contacts 65 are closed.

The internal phase directional relay CHV is normally held against the operation of the spring 66, so that the break-contacts 64 are normally closed, as illustrated, and the make-contacts 65 are normally open, as illustrated, by means of voltage-restraint which is provided by the wattmeter element 58. The current coil 62 of this element is energized in accordance with the phase-AC voltage of the voltage-supply line 31, by means of a suitable step-down transformer 67 for the purpose of converting from the high-voltage, low-current supply characteristic of a voltage coil, to the high-current, low-voltage supply characteristic of a current coil. The current coil 62 is utilized because of its much better space factor than is obtainable with a voltage coil, this being due to the fact that a current coil consists of a large conductor having only a few turns and very light insulation, so that much less space is taken by insulation, relative to the space occupied by copper, when a current coil is utilized. This makes it possible to utilize a smaller wattmeter element 58 than would be the case if it were provided with two voltage coils instead of one voltage coil and one current coil.

The voltage coil 63 of the voltage-restraint wattmeter element 58 is energized in accordance with the phase-BC voltage of the voltage-supply conductors 31, in series with the break-contacts 25, 54 of the three instantaneous phase overcurrent relays $I_A$, $I_B$ and $I_C$, all connected in series, and it may be connected also in series with an external impedance device which may consist of a capacitor 68 and a resistor 69 which introduces a factor equal to the sine of the angle $\phi$ between the phase-AC and phase-BC voltages, so that $\sin \phi$ becomes zero when the phase-AB voltage collapses.

The voltage-restraint torque produced by the wattmeter element 58 is thus the product of three factors, namely, the phase-AC voltage, the phase-BC voltage and the phase-AB voltage, so that the voltage-restraint is proportional to the area of the delta-voltage triangle of the line-voltages, and becomes zero whenever any one of these three delta-voltages becomes zero.

The power-directional torques produced by the three other wattmeter elements 59, 60 and 61 of the internal phase directional relay CHV are all in a direction to actuate the relay so as to open the break-contacts 64 and close the make-contacts 65, when power is flowing into the line in the corresponding phase, A, B, or C thereof, as will be readily understood from the connections illustrated. The wattmeter element 59, for instance, has its current coil 62 energized in accordance with the phase-A line-current as supplied by the current transformer 41, and it has its voltage element 63 energized in accordance with the phase-BC line-voltage as supplied by the voltage-supply line 31.

*An instantaneous external-fault phase directional relay CHY.*—This relay is, or may be, similar to the internal phase directional relay CHV, except that the external phase directional relay CHY has a restraining spring 70 tending to hold the movable element back against a back-stop 71. It has front-contacts 72; it has a voltage-restraint element 73, similar to the voltage-restraint element 58 of the CHV relay, which tends to hold the movable element back against the back-stop 71; and it has three power-directional wattmeter elements 74, 75 and 76 which develop torques tending to hold the movable element back against the back-stop 71 when power is flowing in the respective phases of the line, in the direction from the bus 3 to the line 2, and tending to close the front-contacts 72 when the power is flowing from the line 2 into the bus 3 in the respective phases A, B and C.

*Two auxiliary switches 78 and 79 carried by the circuit breaker 7.*—These are closed when the circuit breaker is closed and open when the circuit breaker is open. The auxiliary switch 78 is in series with the trip coil 8 so as to open the latter when the circuit breaker is open. The auxiliary switch 79 is connected between the negative bus and an auxiliary breaker-position-responsive negative bus BN, to which some of the hereinafter-mentioned auxiliary relaying equipment is connected.

*An instantaneous auxiliary relay X1.*—It is energized whenever there is an indication of current of fault-magnitude, and a direction of power-flow from the bus 3 into the line 2. It has one make-contact 81 and one break-contact 82.

*An instantaneous auxiliary relay IT.*—This is an instantaneous element associated with the back-up timer T1, about to be described. It has one make-contact 83.

*A back-up timer T1.*—This is arranged to move slowly in the actuating direction, and to return to its initial position promptly, as is indicated in the showing of a dashpot 84 connected to this timer relay T1. It has two make-contacts T1' and T1", of which the former may be so disposed that the contacts are made before the T1" contacts are made, although this difference in time is not essential, as will be hereinafter pointed out in the explanation of the circuit-connections and operation of the device.

*A carrier-failure timer T3.*—This is provided with a dashpot 85 or any equivalent means for producing a slow pick-up response. It is provided with one break-contact 86 and one make-contact 87.

*An auxiliary relay Y7.*—This has one make-contact 88 and one break-contact 89. It preferably has a slow pick-up of the order of three cycles of the line-frequency, or more, as indicated by the light dashpot 90 thereon, although this time delay is not vitally necessary, as will be explained in connection with the explanation of the operation hereinafter.

*An out-of-step time lock-out relay T2.*—It has a drop-out time long enough to allow the two ends of the line-section to pass through their out-of-phase condition while the line-losses are being supplied by both ends, this drop-out time being possibly of the order of 10 or 15 cycles to a second, as will be subsequently described, and being obtained by means of a dashpot 91 or any other timing means. This time lock out relay T2 is provided with one break-contact 92.

*An out-of-step auxiliary relay Z4.*—This has one make-contact 93 and one break-contact 94.

*Two auxiliary carrier-maintaining relays Y—Ph. and Y—Gd.*—These relays have make-contacts 95 and 96, respectively, and each relay is also provided with means symbolized by a light dashpot 97, for causing it to be somewhat sluggish in its drop-out movement, introducing a time-delay of 1 or 2 cycles or more, in order to prevent improper operation as a result of the sudden reversal of fault-power in a sound line-section while a fault is being cleared in another sound line-section, as will be subsequently explained more in detail.

*Two auxiliary trip-control relays YP and YG.*—These relays have break-contacts 98 and 99, and also have light dashpots 97, as previously described, in order to prevent improper operation as a result of the sudden flow of fault-current which may not have flowed at all in the sound section until the fault was partially cleared in the faulty section, as will be subsequently explained more in detail.

*A tripping push button 100*

*A contactor CS.*—This is for the purpose of by-passing the light relay-contacts which initially energize the trip-coil circuit 9, so as to prevent damage due to the heavy tripping current. This contactor CS has its operating coil 101 connected in series with the trip coil 8 of the circuit breaker and it has one make-contact 102 which seals-in the contactor and keeps the trip circuit 9 energized until the current is finally interrupted by the auxiliary switch 78 on the breaker.

The circuit connections of the above-described equipment are all shown in Fig 1 and are summarized also in the schematic diagram of Fig. 2, which may be referred to for convenience in tracing out the operation of the apparatus.

Normally the overcurrent phase relays $I_A$, $I_B$ and $I_C$ are in the deenergized positions, with their back contacts 54 closed, thus maintaining voltage-restraint on both the internal phase directional relay CHV and the external phase directional relay CHY at both ends of the line-section 2. The voltage-restraint is sufficient to overcome the action of the internal phase directional CHV relay-spring 66 and to prevent the power-directional torques produced by normal loads from operating said relay CHV, so that the relay contacts 64 and 65 are normally in the positions shown.

Similarly, both ground directional relays CHB and CHE are normally deenergized by reason of the absence of residual power, as is also the ground overcurrent relay Io so that the contacts of these relays are also in the positions shown, and this holds true for both ends of the line-section 2.

Reference to the top of Fig. 2 will show that these conditions normally maintain the plate circuit CR1—CR2 of the transmitter 11 at each end of the line, and keeps the carrier-current on the line.

It will be noted that the make-contacts 95 and 96 of the auxiliary relays Y—Ph. and Y—Gd, are shunted across the break-contacts 64 and 37, respectively, of the internal phase-directional relay CHV and the internal ground-directional relay CHB, respectively. The purpose of these shunting contacts 95 and 96 will be explained later on in connection with the diagrams shown in Figs. 3 and 4.

The normally instantaneous trip-circuit includes the ground overcurrent relay make-contact 33 and the internal ground directional relay make-contact 38 in series, so that both of these contacts must be closed before either one can energize an auxiliary fault-responsive positive bus FP. This circuit also includes the back-contact 99 of the auxiliary relay YG, the purpose of which will be described later on.

The remainder of the trip-circuit includes the receiver-relay break-contact 14 from which the circuit is continued to the coil of the contactor CS and thence to the trip-circuit conductor 9, the trip coil 8, and the auxiliary breaker-switch 78 to the negative terminal.

As shown in Fig. 2, the auxiliary fault-responsive positive bus FP may also be energized by the closure of any one of the make-contacts 49 of the unbalanced-current relay CMP, the three make-contacts 49 being connected in parallel to each other and in series with the make-contact 65 of the internal phase-directional relay CHV. It will be understood that it is necessary for the internal phase-directional relay make-contact 65 to be closed before the auxiliary fault-responsive positive bus FP is energized by the actuation of any one of the three elements comprising the unbalanced-current relay CMP.

As shown in Fig. 2, a circuit is also provided from the positive bus through the break-contact 94 of the auxiliary out-of-step relay Z4, in series with the make-contacts 52 of the phase overcurrent relays $I_A$, $I_B$, and $I_C$, and thence to the CHV make-contact 65. The out-of-step relay-contact 94 of the relay Z4 is shunted by the make-contact T1'' of the back-up timer T1. In series with the CHV relay-contact 65 is the back-contact 98 of the auxiliary relay YP, the purpose of which will be explained later on.

Under normal conditions, the receiver relay RR at each end of the line-section 2 is energized, so that its break-contact 14 is open, thereby interrupting the trip circuit, independently of the condition of the relay contacts interposed between the positive bus and the auxiliary fault-responsive positive bus FP.

When there is a fault involving ground, the instantaneous ground overcurrent relays $I_O$ in the line-sections adjacent to the fault will operate, opening the break-contact 35 of each, and closing the make-contacts 33 and 34. The make-contact 34 by-passes the phase directional break-contacts 64, thus giving preference to the ground relays in the control of the carrier current. This preference is desirable because load power may flow past a single line-to-ground fault, to a load beyond the fault, in sufficient amount to overbalance the torque due to the fault current, thus making it possible for one or more of the internal phase directional relays CHV which are located at various points on the system to give an incorrect indication of the fault-direction under this condition. Thus, if this ground-fault preference is not inserted by the ground-current-responsive make-contact 34, the improper opening of one of the internal phase directional relay-contacts 64 in any line-section would result in the interruption of the transmission of carrier current at a point where it should be maintained in order to provide correct relaying.

The improper operation of the internal phase-directional relay CHV is permitted by reason of the fact that a high value of ground current in one phase may actuate one or more of the contacts 54 of the phase overcurrent relays $I_A$, $I_B$ or $I_C$, in series with the voltage-restraint winding 63, and remove the voltage-restraint from the internal phase directional relay, allowing it to be operated by the load-power, and if the fault is not in the line-section in question, the load-power will be flowing into the line at one end and out of the line at the other, so that improper operation will be obtained at one end.

In case a ground fault occurs on the protected line-section 2, the ground overcurrent relays $I_O$ will be operated at both ends of the section. The internal ground directional relays CHB will also be operated at both ends, thus opening the plate circuits of the carrier-current transmitters and stopping transmission at both ends. This causes the receiver relays RR at both ends to be deenergized, thus closing their break-contacts 14 and completing the trip-circuits through the contacts 33 of the ground overcurrent relay $I_O$, the contacts 38 of the internal ground directional relay CHB, and the back-contacts 99 of the YG relay, at each end of the line.

If the fault involves more than one conductor and the ground fault-current is insufficient to operate the ground overcurrent relay $I_O$, the control of the carrier-current transmission resides in the internal phase directional relay CHV. If the fault is in the protected line-section 2, the internal phase directional relay CHV at each end of the section will interrupt the transmission of carrier current, this relay being now free to operate because of the removal of voltage restraint by reason of the low voltage due to the fault itself or by reason of the removal of all voltage restraint by the actuation of one of the phase-overcurrent relays $I_A$, $I_B$ or $I_C$. As soon as carrier is removed from both ends of the line-section, the receiver relay RR at each end will be deenergized, closing its break-contact 14 and completing the trip circuit, in this case, through the contact 65 of the internal phase directional relay and the contacts 49 or 52 of the unbalanced current relay CMP or the phase overcurrent relays $I_A$, $I_B$ and $I_C$, according as the fault is an unbalanced fault or a three-phase fault.

Under some extreme conditions of system operation, it may happen that the fault currents flowing to the fault from one end of the line will be insufficient to operate the overcurrent relays at that end, until after the circuit breaker at the opposite end has opened. In order to permit instantaneous tripping at said opposite end, however, it is necessary that the transmission of carrier current be interrupted at both ends. This is accomplished at the end carrying the small current as follows, as set forth and claimed in the aforementioned application of William A. Lewis, Serial No. 703,607, filed December 22, 1933, for Continuous carrier relaying.

In case the fault is a single line-to-ground fault, the polyphase voltage will always be distorted, so that there will be sufficient residual voltage to produce a voltage-bias in the internal ground directional relay CHB which will overcome the restraining spring 36 and operate the relay, under conditions when there is little or no ground current and hence little or no power directional torque in either direction. The internal ground directional relay will, therefore, be operated by residual-voltage bias, because the ground current is small, and the back contact 37 will be opened under this condition, thereby interrupting the carrier-current transmission. At the opposite end of the line there will necessarily be ground current as well as residual voltage, so that the apparatus will perform in the usual manner, as previously described, and the tripping will occur at that end as soon as the receiver-relay contact 14 closes. As soon as the circuit breaker opens, clearing the fault at the end carrying the fault current, the current at the end which originally carried the small amount of fault current will usually rise above the tripping value and tripping will follow immediately.

If the fault involves more than one conductor, one or more of the phases of the delta voltage at the end carrying the small current will be reduced to a low value, thereby removing the voltage-restraint from the internal phase directional relay CHV, and this relay will be operated by its spring 66, aided by the slight power-directional torque produced by the small value of fault-current. The operation of this relay opens the contact 64 and since the ground current is small, the ground overcurrent relay contact 34 will remain open, so that the transmitter plate circuit will be interrupted, thus interrupting the operation of the carrier-current transmitter at that station. In other respects, the clearing of such faults is similar to the clearing of the ground faults just discussed.

In the case of an external ground fault producing ground current flowing in the direction from the bus 3 into the line 2, but where the fault is located externally of the line-section 2, the internal ground directional relay CHB at the bus 3 will be actuated, opening its contact 37 and interrupting the transmitter plate circuit, thus interrupting the operation of the carrier-current transmitter 11 at that station. At the other end of the line-section 2, however, the ground power-flow will be from the line to the bus, so that the internal ground directional relay CHB at that station will not be actuated, the torque being in the direction to keep its normally closed contacts 37 closed more tightly, so that the carrier-current transmission at this station will be maintained. Therefore, the receiver relays RR will remain energized at both stations and will keep the trip circuits open at the relay contact 14 at both stations.

In the case of a multi-conductor fault at the same location, which does not involve ground or in which the ground current is so small that the ground overcurrent relay Io is not actuated, the operation will be as follows. At the station shown in the drawings, fault-power flowing from the bus 3 into the line 2 will cause the operation of the internal phase directional relay CHV in the normal manner, and since the ground overcurrent relay Io is not actuated, the opening of the internal phase directional relay-contact 64 will interrupt the transmitter plate circuit and thus interrupt the carrier-current transmitter at this station, but the carrier-current transmission will be maintained at the station at the other end of the line-section 2, so as to prevent tripping.

In case of external faults outside of the line-section 2 but in such direction that the fault-power is flowing from the line into the bus 3, the operation will be the same as described above, except that the stations at the two ends of the line-section 2 will be interchanged in the description.

In case of an external fault, outside of the protected line-section 2, but in such a location, or under such conditions, that current of fault-magnitude is not flowing at either one or both ends of the protected line-section, proper relaying operations are secured by special protective features which will now be described.

The first condition which will be discussed is the condition resulting from the fact that there may be, in the transmission system, an adequate source of power at only one end of the protected line-section, so that the current at the other end does not attain fault-magnitude. This condition will be made clear by reference to the single-line diagrams of Figs. 3 and 4, wherein a transmission system is shown involving a source S, feeding a bus 3 which, in turn, feeds line-sections 1 and 2 through circuit breakers 4 and 7 respectively. The opposite ends of the line-sections 1 and 2 are connected to a bus 103 through circuit breakers 104 and 105 respectively, and the bus 103 is, in turn, connected to additional line-sections 106 and 107 through breakers 108 and 109. The far ends of the line-sections 106 and 107 are connected eventually to a second sourse S'.

Referring to Fig. 3, if a fault occurs at X, near the far end of the parallel line-section 1, the fault-power will flow in the direction shown by the arrows. It will be noted that the power-flow is from the buses 3 and 103, respectively, into the faulty line 1, at both ends, so that carrier is removed from both ends, and instantaneous tripping is permitted. In the sound line 2, however, the fault-power is flowing from the bus 3 into the line, thus removing carrier from that end of the line, but the fault-power is flowing from the line to the bus 103 at the other end, thus maintaining carrier at that end and preventing the tripping of the breakers 7 and 105 at the two ends of the sound line 2.

In the faulty line 1, the tripping circuits of the two circuit breakers 4 and 104 will be substantially simultaneously energized, so that both breakers begin arcing at substantially the same time, but it is almost inevitable that the breaker carrying the heavier current, which would generally be the breaker 104 closest to the fault, would cease arcing a half-cycle or more ahead of the other breaker, or that one breaker would cease arcing in one of its poles before its other poles, so that there would or might be a sudden reversal of fault-current in the sound line.

Thus, if the breaker 104 opens before the breaker 4, in the faulty line, the conditions will be as depicted in Fig. 4. It will be noted, from the arrows, that the current has reversed at both ends of the sound line 2. This means that the far end, containing the breaker 105, which was at first maintaining the carrier, so as to prevent tripping, will, if nothing is done to prevent it, stop transmitting carrier as soon as either one of its internal-fault directional relays CHB or CHV backs off of its back-contact 37 or 64, as the case may be. However, at the near end of the sound line 2, where the circuit breaker 7 is located, the internal directional element CHB or CHV which has responded to the fault-power-flow shown in Fig. 3, has moved to the extreme limit of its travel, with its back-contact 37 or 64, as the case may be, wide open, and it has to move much further than the corresponding relay at the far end where the circuit breaker 105 is, before the previously open back-contact can be reclosed, thus restoring carrier. It is almost inevitable, therefore, that there will be a half-cycle or several half-cycles during which carrier will be removed from the sound line 2, thus permitting the tripping of this sound line which should be avoided by all means, if at all possible, because such faulty tripping would be very likely to cause a serious interruption in service.

Means for overcoming this difficulty constitute the subjects-matter of an application of Robert D. Evans and William A. Lewis, Ser. No. 703,605, filed December 22, 1933 for a Relaying system with directional indication storage, and an application of Roy M. Smith, Serial No. 703,610, filed December 22, 1933 for Continuous carrier relaying. Both of the applications just mentioned are directed particularly to the problems of continuous carrier-current relaying. Some of the general principles of preventing faulty operation as the result of non-simultaneous operation of breakers or of the different poles of a polyphase breaker are also covered in an application of Edward H. Klemmer, Serial No. 703,609, filed December 22, 1933 for Relaying systems. The particular means shown in the drawing of the present application for overcoming this reversed-power difficulty in continuous carrier current relaying systems is that which is shown and claimed in the Evans and Lewis application.

The condition due to the sudden reversal of fault-power, just described, is taken care of, in my relaying system, by means of the auxiliary relays Y—Ph. and Y—Gd., similarly to the subject-matter of the Evans and Lewis application.

My system, however, also performs an additional function, which has never before, to my knowledge, been satisfactorily met in any continuous-carrier relaying system, and that is, the performance of correct relaying operations in the sound line in case there should be an external fault so disposed that no current of fault-magnitude flows at all in the sound line until after the fault is partially cleared from the faulty line. By correct relaying operations in the sound line, I mean, of course, the prevention of tripping in the sound line. This condition will now be explained.

Referring to Fig. 3, if the fault, instead of being near the far end of the parallel line 1, as shown at X, has been located near the middle of this parallel line 1, fault-current would flow into both ends of the faulty line, as indicated by the arrows over the breakers 4 and 104, but practically no fault-current would flow in the sound line 2, because the fault in line 1 would bring down the voltages in the buses 3 and 103 in substantially equal amounts. Under these circumstances, carrier would be removed from both ends of the sound line 2 because of a drop in phase-to-phase voltage or a rise in residual voltage, without fault-current in either case.

It may happen, however, that one of the breakers 4 or 104 on the faulty line 1 may cease arcing before the other, or that one pole of one of the breakers may cease arcing first. In either case, there will be a sudden flow of fault-current in the sound line 2 at a time when both receiver relays RR are deenergized, which will result in the tripping of the sound line unless carrier is restored before the tripping circuits responsive to the fault-current can be completed.

As previously noted, however, the transmitter plate-circuit CR1—CR2 is controlled by means of back-contacts on the internal directional elements. This means is used instead of the alternative possibility of controlling the transmitter grid-circuit (not shown) by front-contacts on said internal directional relays. The adopted system is most desirable because the internal directional relays may be made to move off of their back-contacts with a much smaller movement than the closest practical separation of any front-contacts, so that quicker interruption of the carrier-current transmission is obtained by a control system responsive to the opening of a back-contact than with one which is responsive to the making of a front-contact of the directional element.

The restoration of carrier-current transmission to the sound line 2, in response to the sudden flow of fault-current during the clearing of a fault in the center of the parallel line 1, will necessarily be slower, therefore, than the removal of the carrier in response to an internal fault condition, unless a sacrifice is made in the speed of operation at all times. After the carrier has been restored, there will be an additional time necessary for the pick-up of the receiver relays RR. All of this will introduce a time-delay of at least 2 or 4 cycles, with any practical separation of relay contacts in actual service, where some allowance must be made for dusty contacts and other maintenance difficulties, and this time-delay must be introduced before it will be proper to permit the tripping circuit to be completed through either 33—38—99 or 49—65—98 or 94—52—65—98.

If the continuous carrier relaying system were so designed that a time-delay of over two or four cycles were introduced in each relaying opertion, it would have no advantage, in time of operation, over the intermittent carrier system.

According to my invention, therefore, I do not introduce any time-delay in the normal operation of my continuous carrier relaying system, but I utilize means, embodying my auxiliary relays YP and YG, whereby I introduce a time-hesitation only when it is necessary to prevent tripping when there is no fault on the protected line-section.

Referring to Fig. 2, it will be seen that the coil of the Y—Ph. relay is energized whenever the external phase directional relay CHY closes its contact 72.

A circuit for energizing the YP relay extends from the TS3 conductor, which is responsive either to carrier-failure or transmitter failure, thence through the back-contacts 50 and 55 of the unbalanced-current relay CMP and the phase-overcurrent relays I$_A$, I$_B$ and I$_C$, respectively. The TS3 conductor will normally not be energized except upon failure of carrier reception, and then, if there is no phase-current of fault-magnitude, the YP relay will be energized.

As soon as the YP relay responds, its back-contact 98 will open the tripping circuit which is responsive to phase faults, and this circuit will stay open for some two or four cycles, or other predetermined time, after the deenergization of the YP relay, so as to introduce that much time-delay before it will be possible to trip the circuit breaker 7 by means of the phase-fault-responsive circuits 49—65—98 or 94—52—65—98.

The condition of sudden reversal of phase-fault current on the sound line 2 during the interruption of a fault at X near one end of the parallel line 1, as first discussed in connection with Figs. 3 and 4, will be taken care of in my system by the Y—Ph. relay, the operating coil of which will be energized, as soon as the fault occurs on the parallel line 1, because of the actuation of the external phase-directional relay CHY which is associated with the breaker 105 at the end closest to the fault on the other line, that is, at the end at which the fault current is flowing out of the protected line 2. The Y—Ph. relay will then pick-up, and will effect the closure of its front-contact 95. The closure of the front-contact 95 will make it impossible for the internal phase directional relay-contact 64 at the circuit breaker 105 of the sound line 2 to thereafter remove the carrier from the sound line.

Upon the sudden reversal of fault-current in the sound line, as depicted in Fig. 4, the Y—Ph. relay-coil will be promptly deenergized by the return of the external phase directional relay CHY to its normal position, opening the directional relay-contact 72. But the front-contacts 95 of the Y—Ph. relay will not change their condition until after a certain time-delay which is inherent in the Y—Ph. relay, during which time-delay the carrier-current transmission will be maintained by the contact 95 and the tripping of the breaker 105 will be prevented by the open RR contact 14.

The second condition discussed in connection with Fig. 3, wherein carrier is removed from both ends of the sound line 2 by reason of phase-voltage failure unaccompanied by phase current, thereby causing the internal phase directional relay CHV to be actuated by its spring 66, will be taken care of by my YP relay. In this case, the YP relay will be energized in response to the removal of carrier by the CHV relay, resulting in the closure of the RR relay-contact 15, and also by means of a circuit including the back-contacts 50 and 55 of the unbalanced-current relay CMP and the overcurrent phase relays I$_A$, I$_B$ and I$_C$, which will not be actuated. The YP relay will then open its back-contact 98, which should be done before either circuit breaker 4 or 104 on the faulty line I ceases arcing.

Upon the sudden flow of phase fault-current in the sound line 2, which occurs after one of the breakers 4 or 104 ceases arcing before the other, on the parallel line I, the YP relay will be instantly deenergized by the opening of one of the contacts 50 or 55 of the current-responsive relays, thereby causing the YP relay to begin to return to normal position, introducing, however, the time-delay necessary to prevent faulty tripping in a manner similar to that which has already been described.

If the fault under any of the conditions just described had been a ground fault, rather than a phase fault, my auxiliary Y—Gd. and YG relays would have been involved. The Y—Gd. relay is energized by means of the contact 45 of the external ground directional relay CHE, whereas the YG relay is energized by the back-contact 35 of the ground overcurrent relay I$_o$, the latter contact being connected between the TS3 conductor and the operating coil of the YG relay. The front-contact 96 of the Y—Gd. relay is in parallel with the plate-circuit contact 37 of the internal ground directional relay CHB, and the back-contact 99 of the YG relay is in series with the trip-circuit contacts 33 and 38 of the ground overcurrent relay I$_o$ and the internal ground directional relay CHB respectively. The protective operation of these contacts 96 and 99 of the Y—Gd. and YG relays, respectively, is similar to that which has already been described for the corresponding contacts 95 and 98 of the Y—Ph. and YP relays.

My YP and YG relays are also useful in preventing any possible faulty operation due to the want of sufficient current to produce tripping at one end of the protected line-section, because of a want of an adequate source of current at one end of the transmission line. The YP and YG relays make it impossible for the circuit breaker on the protected line to be hastily, and, therefore, possibly improperly, tripped in response to the sudden increase of the current to fault-magnitude which occurs as soon as the fault is partially cleared by the breaker which carries the current which attained fault-magnitude from the very first. My system thus introduces enough time-delay to make sure that the directional elements are recording properly before the overcurrent elements can bring about the tripping of the circuit breaker being controlled.

The complete protective relay system illustrated in Figs. 1 and 2 of my drawings also includes certain other features which will now be referred to in order to complete the description of a fully effective continuous carrier current system of which my improvements constitute a part.

Out-of-synchronism conditions have, in times past, presented a difficulty, in any kind of pilot relaying, whether utilizing continuous carrier, intermittent carrier, or pilot wires, because, at one or more points in the transmission system, which are called electrical centers, it may appear that power is flowing into these points just as if there were a three-phase fault at each of these points, so that any relaying system responsive to three-phase faults would respond to such out-of-synchronism conditions so as to trip out the line-sections containing these electrical centers of the distribution system. In the relaying system shown in the drawings, means have been provided for affording out-of-step protection, and preventing faulty relaying operations under these conditions. Said means, and the method of operation involved thereby, constitutes the subject matter of an application of William A. Lewis, Serial No. 703,606, filed December 22, 1933, for Out-of-step protection. In order to make the description of the entire relaying system complete in this application, the following description of the out-of-step protection is included.

During the early stages of out-of-step operation, the two ends of each line-section begin gradually to swing apart in phase, increasing the phase-angle between the two ends until exact phase opposition is reached at 180° and then on through to 360°, and then repeating the cycle, requiring a time which may be of the order of a second or several seconds to complete a cycle, dependent upon the system-constants and the operating conditions of the system.

Out-of-synchronism conditions are recognized by the fact that, during the early stages, power flows through each line-section from one end to the other in a manner similar to an external fault, the current increasing from load-magnitude to fault-magnitude as loss of synchronism is approached. As the power-sources feeding the two ends of the line-section reach approximate phase-opposition, there will be no change in power flow in those sections which do not contain an electrical center.

But where an electrical center of the system falls in any particular line-section, there will be a brief period in the out-of-synchronism cycle of the transmission system, lasting from just before until just after the 180° phase position is reached, when the losses of the line are being supplied at both ends of the line-section, so that power of fault-magnitude flows into such a line-section from both ends, thus momentarily simulating an internal three-phase fault. This is a condition of unstable equilibrium and will not be maintained, returning again to a through-power condition, with power flowing in at one end and out at the other end of the line-section, soon after the condition of exact phase-opposition is past, so that if the tripping sequence of the three-phase fault-responsive devices is momentarily opened by a time-delay relay energized before the condition of phase-opposition is reached, tripping will be prevented.

In the illustrated relaying system, as the two sources pull out of synchronism, power flows through the relayed section 2 at the same time that current of fault-magnitude is approached. Under this condition, the voltage restraint is removed from the internal phase directional relay CHV, and carrier is removed from the end where power flows into the section. At the other end of the section, however, power is flowing out, and consequently carrier is maintained at that end. This condition is recognized by the continuance of a three-phase overcurrent for a time long enough for the fault to have been cleared, wherever it was, if the overcurrent had been caused by a fault anywhere on the system.

Referring to Fig. 2, it will be noted that a relay Y7 is provided, having a slightly delayed pick-up action, so that it will be actuated if the receiver relay RR remains energized, so that the RR contact 16 stays closed, for a predetermined time after an overcurrent condition exists, as indicated by the picking up of the phase overcurrent relays I_A, I_B and I_C, which close their contacts 53. The time-hesitation in the pick-up of the relay Y7 need be only of the order of two or three cycles of the fundamental line frequency, or slightly more, so that if the overcurrent condition arose as a result of an internal fault in the protected line-section, tripping could occur, as will be subsequently pointed out. It will be observed that the tripping circuit of the relay Y7 extends from the positive bus, through the receiver-relay contact 16, to the conductor RC, thence to the operating coil of the relay Y7, and the overcurrent-relay contacts 53, to the negative bus.

As soon as the out-of-step relay Y7 picks up, it closes its contact 88 and thus completes a circuit from the positive bus to the tripping coils of both the out-of-step time lock-out relay T2 and the auxiliary out-of-step relay Z4. The energization of the relay Z4 immediately closes a holding circuit through the Z4 relay-contact 93, by-passing the Y7 relay-contact 88, and it also interrupts the three-phase fault-responsive tripping circuit by reason of the opening of the Z4 relay-contact 94. The Z4 relay pick-up time, from the first energization of the Y7 coil, that is, from the first actuation of the overcurrent relays I_A, I_B and I_C, must be longer than it would take to close the trip-contact 102 of the contactor CS in case of a three-phase fault, which is or may be of the order of two cycles.

The out-of-step timing relay T2 is of the instantaneous pick-up type, with time-delay reset. Its actuating coil is by-passed by the Y7 relay-contact 89 which closes when the Y7 relay is deenergized. The T2 relay has a back-contact 92 which closes after a predetermined time-delay upon the deenergization of the relay T2, and the circuits are such that when back-contacts 89 and 92 of both Y7 and T2 are closed the actuating coil of the Z4 relay will be short-circuited, thus deenergizing the latter, reclosing the Z4 back-contact 94 in the tripping circuit, and opening the Z4 holding-circuit at 93.

If there is not an electrical center in the line-section 2 being protected, the receiver-relay front-contact 16 will remain closed throughout the out-of-synchronism condition, and the overcurrent relay contacts 53 will remain closed until near the end of the out-of-synchronism cycle, when the two sources at the two ends of the line will again approach in-phase position. As the two sources vary in speed, they will change successively from in-phase position to out-of-phase position, resulting respectively in the alternate deenergization and energization of the Y7 relay, following the slip frequency. There is no need for out-of-step protection under these circumstances, because we have assumed a line-section in which there is no electrical center and hence in which there is never a condition of the simultaneous flowing of power of fault-magnitude into both ends of the line-section.

If an electrical center of the transmission system should fall within the line-section 2 being protected, there will be a brief time, near the condition of exact phase-opposition of the two sources, when power of fault-magnitude will flow into both ends of the line-section, thus operating both of the internal phase directional relays CHV and interrupting carrier-current transmission at both ends, so that each of the receiver relays RR is deenergized. The deenergization of the receiver relay RR opens its contact 16 and deenergizes the Y7 relay, thus short-circuiting the energizing coil of the T2 relay by the closure of the Y7 relay back-contact 89.

The T2 relay then starts to drop out, and its drop-out time (plus the Y7 relay drop-out time) must be of the order of 10 or 15 cycles to a second, or long enough to permit riding over that portion of the out-of-step cycle in which the relaying conditions are similar to an internal three-phase fault, or until the internal phase directional relays CHV at the two ends of the line-section again register an external fault, that is, with one of the relays registering power flowing into the line and the other registering power flowing out of the line, thus restoring carrier-current transmission to one end of the line, picking up the receiver relays RR at both ends of the line. At this time, the Y7 relay is again energized, thus removing its short-circuit 89 from the operating coil of the T2 timing relay and permitting the latter relay to move its back-contact 92 wide open before it had had time to become closed. The T2 timing relay will thus be kept in its energized position, and its back-contact 92 will not close during the out-of-synchronism condition. As long as the T2-relay back-contact 92 does not close, the Z4 relay will remain energized and will, in turn, prevent tripping by reason of its open back-contact 94 in the tripping circuit of the three-phase fault-responsive device.

It is recognized that an out-of-step condition may simulate a three-phase fault not involving grounds and that, therefore, the unbalanced-current fault-responsive relay, as well as the ground protection, will not be involved. Reference to Figs. 1 and 2 of the drawings will show that the Z4 relay contact 94 is in series with only that portion of the tripping circuit which is responsive to three-phase faults. It does not interfere with the response to unbalanced phase faults or ground faults. Thus, if either a ground fault or an unbalanced phase fault should occur during out-of-synchronism conditions, the fault will be cleared instantly just as if the out-of-synchronism condition did not exist. If a three-phase fault should occur during out-of-synchronism conditions, it cannot be cleared until the T2 timer closes its back contact 92, thereby short-circuiting the operating coil of the Z4 relay and closing the back-contact 94 of the latter. This would involve the time-delay which is inherent in the drop-out time of the T2 timing relay.

It will now be appreciated why the Y7 relay should have a somewhat slow pick-up of at least two or three cycles, or why the overall pick-up time of the Z4 relay, from the beginning of the energization of the Y7 coil, must be of the order of two or three cycles, or longer than it takes to close the trip contacts 102 of the contactor CS in case of a three-phase fault, which is of the order of two cycles. This is so, because as soon as the Z4 relay picks up, its back-contact 94 opens and prevents tripping as a result of a three-phase fault.

The relaying system shown in the drawings also provides for back-up protection. Referring to Fig. 2, it will be noted that the X1 relay coil is energized whenever the energization of the auxiliary fault-responsive positive bus FP indicates the presence of a fault with fault-power flowing from the bus 3 into the line 2. The energization of the operating coil of the X1 relay is completed from the FP bus, through the X1 coil, to the auxiliary negative bus BN.

Whenever there is a current of fault-magnitude, accompanied by fault power-direction from the bus to the line, whether the fault is an internal fault within the line-section 2, or an external fault outside of it, the X1 relay will be energized, and its front contact 81 will energize the operating coils of both the back-up timer T1 and its instantaneous auxiliary relay IT. The front contact 83 of the instantaneous relay IT will complete a holding circuit of the relay IT and the timer T1, provided that it is a three-phase fault which actuated the X1 relay, as indicated by the energization of the overcurrent relays I_A, I_B and I_C, resulting in the closure of their contacts 51. This holding circuit 51—83 is necessary in order to maintain the energization of the T1 timer even after the interruption of the energization of the fault-responsive relay X1, because such an interruption of X1 may be brought about by the actuation of the relay Z4 of the out-of-step protective system. By this means, the timer T1 will remain energized after the energization of the out-of-step protective elements.

Thus, if there were a three-phase fault in the second line-section, that is, in the line-section to the right of the right-hand end of the line-section 2 shown in the drawings, the operation of of the back-up protective features on the line 2 would not be cut-off by the Z4 out-of-synchronism relay.

The back-up timer T1 is set to have a time of operation long enough to permit normal tripping in the second section, for example, if the fault is in the second section, whether the fault is a ground fault, an unbalanced fault, or a three-phase fault. This time will include both the relay time and the necessary circuit-breaker time, it being understood that quick-acting circuit breakers, as quick as three cycles or even less, will be utilized. If the fault is not cleared in a predetermined time which is longer than that necessary for it to be cleared if the relaying equipment is operating properly, the back-up timer T1 will close its first contact T1' which by-passes the circuit containing the receiver-relay back-contact 14 and the carrier-failure-timer back-contact 86, so that tripping will be effected even though carrier current is not removed from the line, that is, even though the receiver relay RR remains energized, with its back-contact 14 open.

At the close of the pick-up movement of the back-up timer T1, it closes its second contact T1″, which by-passes the Z4 contact 94 of the out-of-step protection, and makes it possible to clear a three-phase fault through the back-up tripping contacts T1″ and T1'. The time-delay in the closure of the T1″ contact may be very great, of the order of several seconds or even minutes, in order to insure that the circuit breaker 7 is not tripped during the continuance of any possible or probable out-of-synchronism condition. No such great time-delay is necessary, however, in the back-up protection for faults involving grounds or unbalanced currents, and hence the T1' back-up timer contacts may close in a much shorter time, merely long enough to permit the fault to be cleared by some other circuit breaker, if it is going to be cleared at all, before the operation of the back-up timer contact T1' makes it possible to clear the fault by means of the circuit breaker 7 which is being controlled.

An important advantage of the continuous carrier system over the intermittent carrier system is that the continuous carrier system may readily embody means for quickly indicating any fault in the carrier-current apparatus, whether transmitter or receiver, as soon as it occurs, whereas, in an intermittent carrier system, such a fault may not become evident until an occasion arises for putting the carrier onto the line in order to prevent tripping, in which case its failure will result in a faulty tripping operation, which is the first notice which the station-operator has of the carrier-current failure. The carrier-current failure indication shown in the drawings is similar to that which is shown and covered in the previously mentioned Lewis and Evans application Serial No. 660,342.

Referring to Fig. 2 of the accompanying drawings, it will be noted that a circuit is completed from the positive bus to a conductor marked TS3 upon the deenergization of either the receiver relay RR or the transmitter supervisory relay TS, closing their back contacts 15 and 12 respectively. If, at the same time that the TS3 conductor is energized, there is not a fault on the line-side of the bus 3, the X1 relay will not be energized, and the back-contact 82 of the latter will be closed, completing a circuit from the TS3 conductor to the operating coil of the carrier-failure timer T3, from which the circuit is completed to the auxiliary negative bus BN. After a suitable time-delay, which is longer than the longest tripping time of the back-up protection, the carrier-failure timer T3 will complete its pick-up movement and will close its front-contact 87, completing a circuit from the TS3 conductor to an alarm, at the same time opening its back-contact 86 in the tripping circuit, thus permanently locking out the receiver-relay tripping-contact 14 and thereafter permitting tripping only as a result of the back-up protection afforded by the T1' contact, until the station-attendant, aroused by the alarm, has had time to discover and correct the cause of the carrier-failure.

A modification of my invention is shown in Figs. 5 and 6, which correspond to Figs. 1 and 2, respectively, except that only those parts are shown which are necessary in order to illustrate the modification which has been introduced. In this modified form of embodiment of my invention, the auxiliary relays Y—Ph., Y—Gd., YP and YG have been replaced by two auxiliary relays YR and YV which are energized to give protection, respectively, against sudden reversal of fault-power and a voltage-indication of fault without fault-current.

The actuating coil of the YR relay is energized by either the make-contact 45 of the external ground directional relay CHE, or the make-contact 72 of the external phase-directional relay CHY, said two make-contacts being connected in parallel. The YR relay has one make-contact 111 which is across the whole plate circuit CR1—CR2, being in shunt to both of the back-contacts 37 and 64 of the two internal directional relays CHB and CHV.

The auxiliary relay YR is provided with a light dashpot 112 or other equivalent means for causing it to have a slight time-hesitation in drop-out for the same purpose that the described drop-out was provided for the Y—Ph. and Y—Gd. relays.

The other auxiliary relay, YV, has its operating coil so connected that it is energized in response to the failure of carrier reception, as indicated by the dropping of the RR relay contact 15 which energizes the conductor TS3, if, at the same time, there is neither ground-current, which would open the back-contact 35 of the ground-current relay Io, nor phase overcurrent, which would lift one or more of the contacts 50 or 55 of the unbalanced-current relay CMP or the phase over-current relays $I_A$, $I_B$ or $I_C$. The YV relay is provided with one back-contact 113 which is interposed between the auxiliary fault-responsive positive bus FP and the two make-contacts 38 and 65 of the internal directional relays CHB and CHV, respectively.

The auxiliary relay YV is provided with a light dashpot 114 or other equivalent means for producing a slight time-delay in its drop-out, similar to the time-delay which was provided in the drop-out time of the auxiliary relays YP and YG of the embodiment of my invention shown in Figs. 1 and 2.

The operation of the auxiliary relays YR and YV should be fairly obvious from the previous description.

When there is a fault giving a positive indication of current-flow in such direction that it is certain that the fault is outside of the line-section being protected, the YR relay picks up and establishes a hold-circuit 111 across the transmitter plate-circuit, and said hold-circuit is maintained for a slight time after the sudden reversal of fault-power, which may take place in the sound line during the process of clearing the faulty line from the system. This provides sufficient time for the carrier-current transmission to be restored at the other end of the sound line before it is interrupted at the end which at first was maintaining the transmission. This gives full protection against faulty relaying operations due to the sudden reversal of fault-power in the sound line.

In case the carrier-current transmission is removed from either end of the line-section being protected, as a result of a voltage-indication of fault without an adequate source of power to give current of fault-magnitude at the same time, the YV relay is energized to interpose a break at 113 in the tripping circuit of the protective relay at that end where there was no fault-current, so that, if the fault-current should suddenly flow momentarily during the clearing of a fault which may be on some other line-section, the tripping circuit will not be restored into operative condition for a short period of time, which is long enough to give the fault-responsive directional elements time to set themselves properly in response to the direction of the fault-current now flowing in the line-section being protected. This gives full protection against operational difficulties resulting from the removal of carrier-current transmission in response to a voltage indication of fault in the absence of fault-current.

While I have shown my invention in two illustrative forms of embodiment, it will be understood that various modifications and alterations may be resorted to, as will be more or less obvious to those skilled in the art, without departing from the general basic principles of my invention. I desire, therefore, that the appended claims shall be accorded the broadest interpretation consistent with their language and the prior art.

I claim as my invention:

1. Protective relaying equipment for effecting a control of line-sectionalizing circuit-interrupter means for a transmission line-section, comprising, at each end of the line-section being protected, relaying means including means for obtaining both a directional response to a fault-current power-flow into the protected line-section and also a response to a voltage-change which indicates the presence of a fault on the transmission-line under conditions when there is no corresponding current-flow of fault-magnitude, said relaying means also including fault-indicating means for securing an indication of the actual presence of a fault on the transmission-line, a communicating-channel between the two ends of the line-section being protected, a transmitter means disposed at each end of the line-section for normally continuously transmitting a signalling current through said communicating channel to the other end of the line-section, transmitter-controlling means, responsive both to said directional response of the relaying means and the response to the voltage-indication of fault without corresponding fault-current, for causing said transmitter to cease transmitting effective signalling current, a receiver disposed at each end of the line-section and associated with said communication channel, receiver-means at each end, responsive to a failure of the receiver to receive a sufficient signalling current, and responsive also to the direction of power-current-flow into the line-section being protected, for quickly energizing a control circuit for the circuit-interrupter means at that end, and means responsive jointly to a failure of the receiver to receive a sufficient signalling current and a failure of an indication of the actual presence of a fault on the transmission-line, for thereafter interposing a slight time-hesitation in the tripping functions of the protected line-section.

2. Protective relaying equipment for effecting a control of line-sectionalizing circuit-interrupter means for a transmission line-section, comprising at each end of the line-section being protected, relaying means including means for obtaining both a directional response to a fault-current power-flow into the protected line-section and also a response to a voltage-change which indicates the presence of a fault on the transmission-line under conditions when there is no corresponding current-flow of fault-magnitude, said relaying means also including fault-indicating means for securing an indication of the actual presence of a fault on the transmission-line, a communicating-channel between the two ends of the line-section being protected, a transmitter means disposed at each end of the line-section for normally continuously transmitting a signalling current through said communicating channel to the other end of the line-section, transmitter-controlling means, responsive both to said directional response of the relaying means and the response to the voltage-indication of fault without corresponding fault-current, for causing said transmitter to cease transmitting effective signalling current, a receiver disposed at each end of the line-section and associated with said communication channel, receiver-means at each end, responsive to a failure of the receiver to receive a sufficient signalling current, and responsive also to the direction of power-current-flow into the line-section being protected, for quickly energizing a control circuit for the circuit-interrupter means at that end, means associated with the aforesaid equipment for affording an indication of the existence of a fault externally of the protected line-section, time-hesitation means responsive to such external-fault indication for thereafter insuring the transmission of a sufficient signalling current, and time-hesitation means responsive jointly to a failure of the receiver to receive a sufficient signalling current and a failure of an indication of the actual presence of a fault on the transmission-line, for thereafter interposing a slight time-hesitation in the actuation of the associated line-sectionalizing means.

3. Protective relaying equipment for effecting a control of line-sectionalizing circuit-interrupter means for a transmission line-section, comprising, at each end of the line-section being protected, relaying means including means for obtaining both a directional response to a fault-current power-flow into the protected line-section and also a response to a voltage-change which indicates the presence of a fault on the transmission-line under conditions when there is no corresponding current-flow of fault-magnitude, said relaying means also including fault-indicating means for securing an indication of the actual presence of a fault on the transmission-line, a communicating-channel between the two ends of the line-section being protected, a transmitter means disposed at each end of the line-section for normally continuously transmitting a signalling current through said communicating channel to the other end of the line-section, transmitter-controlling means, responsive both to said directional response of the relaying means and the response to the voltage-indication of fault without corresponding fault-current, for causing said transmitter to cease transmitting effective signalling current, a receiver disposed at each end of the line-section and associated with said communication channel, receiver means at each end, responsive to a failure of the receiver to receive a sufficient signalling current, and responsive also to the direction of power-current-flow into the line-section being protected, for quickly energizing a control circuit for the circuit-interrupter means at that end, and means responsive jointly to a failure of the receiver to receive a sufficient signalling current and a failure of an indication of the actual presence of a fault on the transmission-line for thereafter interposing a slight time-hesitation in the energization of the control circuit for the circuit-interrupter means at that end.

4. Protective relaying equipment for effecting a control of line-sectionalizing circuit-interrupter means for a transmission line-section, comprising, at each end of the line-section being protected, relaying means including means for obtaining both a directional response to a fault-current power-flow into the protected line-section and also a response to a voltage-change which indicates the presence of a fault on the transmission-line under conditions when there is no corresponding current-flow of fault-magnitude, said relaying means also including fault-indicating means for securing an indication of the actual presence of a fault on the transmission-line, a communicating-channel between the two ends of the line-section being protected, a transmitter means disposed at each end of the line-section for normally continuously transmitting a signalling current through said communicating channel to the other end of the line-section, transmitter-controlling means, responsive both to said directional response of the relaying means and the response to the voltage-indication of fault without corresponding fault-current, for causing said transmitter to cease transmitting effective signalling current, receiver means at each end of the line-section for receiving the signalling current transmitted from its own end as well as the other end, trip-circuit means at each end of the protected line-section for quickly energizing a control-circuit for the circuit-interrupter means, said trip-circuit means being responsive to a failure of the receiver to receive a sufficient signalling current, and being responsive also to an indication of the actual presence of a fault on the transmission-line, with current-flow into the protected line-section, and means responsive jointly to a failure of the receiver to receive a sufficient signalling current and a failure of an indication of the actual presence of a fault on the transmission-line, for thereafter interposing a slight time-hesitation in the tripping functions of the protected line-section.

5. Protective relaying equipment for effecting a control of line-sectionalizing circuit-interrupter means for a transmission line-section, comprising, at each end of the line-section being protected, relaying means including means for obtaining both a directional response to a fault-current power-flow into the protected line-section and also a response to a voltage-change which indicates the presence of a fault on the transmission-line under conditions when there is no corresponding current-flow of fault-magnitude, said relaying means also including fault-indicating means for securing an indication of the actual presence of a fault on the transmission-line, a communicating-channel between the two ends of the line-section being protected, a transmitter means disposed at each end of the line-section for normally continuously transmitting a signalling current through said communicating channel to the other end of the line-section, transmitter-controlling means, responsive both to said directional response of the relaying means and the response to the voltage-indication of fault without corresponding fault-current, for causing said transmitter to cease transmitting effective signalling current, receiver means at each end of the line-section for receiving the signalling current transmitted from its own end as well as the other end, trip-circuit means at each end of the protected line-section for quickly energizing a control-circuit for the circuit-interrupter means, said trip-circuit means being responsive to a failure of the receiver to receive a sufficient signalling current, and being responsive also to an indication of the actual presence of a fault on the transmission-line, with current-flow into the protected line-section, means associated with the aforesaid equipment for affording an indication of the existence of a fault externally of the protected line-section, time-hesitation means responsive to such external-fault indication for thereafter insuring the transmission of a sufficient signalling-current, and time-hesitation means responsive jointly to a failure of the receiver to receive a sufficient signalling current and a failure of an indication of the actual presence of a fault on the transmission-line, for thereafter interposing a slight time-hesitation in the actuation of the associated line-sectionalizing means.

6. Protective relaying equipment for effecting a control of line-sectionalizing circuit-interrupter means for a transmission line-section, comprising, at each end of the line-section being protected, relaying means including means for obtaining both a directional response to a fault-current power-flow into the protected line-section and also a response to a voltage-change which indicates the presence of a fault on the transmission-line under conditions when there is no corresponding current-flow of fault-magnitude, said relaying means also including fault-indicating means for securing an indication of the actual presence of a fault on the transmission-line, a communicating-channel between the two ends of the line-section being protected, a transmitter means disposed at each end of the line-section for normally continuously transmitting a signalling current through said communicating channel to the other end of the line-section, transmitter-controlling means, responsive both to said directional response of the relaying means and the response to the voltage-indication of fault without corresponding fault-current, for causing said transmitter to cease transmitting effective signalling current, receiver means at each end of the line-section for receiving the signalling current transmitted from its own end as well as the other end, trip-circuit means at each end of the protected line-section for quickly energizing a control-circuit for the circuit-interrupter means, said trip-circuit means being responsive to a failure of the receiver to receive a sufficient signalling current, and being responsive also to an indication of the actual presence of a fault on the transmission-line, with current-flow into the protected line-section, and means responsive jointly to a failure of the receiver to receive a sufficient signalling current and a failure of an indication of the actual presence of a fault on the transmission-line, for thereafter interposing a slight time-hesitation in the energization of the control circuit for the circuit-interrupter means at that end.

7. Protective equipment for a line-section of a transmission-line, comprising line-sectionalizing circuit-interrupter means and relaying means therefor at each end of the line-section being protected, each of said relaying means including means for securing a directional response to fault-current power-flow into the protected line-section and also a response to a voltage-change indicating the presence of a fault on the transmission-line without the accompaniment of a corresponding current-flow of fault-magnitude, each of said relaying means also including means for providing an indication of the actual presence of a fault on the transmission-line, means for providing an intelligence-communicating channel between the two ends of the protected line-section, auxiliary means associated with said intelligence-communicating channel for selectively cooperating with the aforesaid responses of said relaying means at the two ends of the protected line-section, in response to a directional indication, or in response to a voltage-indication of fault without corresponding fault-current, so as to provide a trip-circuit indication, trip-circuit means, at each end, for quickly actuating the circuit-interrupter means at its end of the protected line-section, said trip-circuit means being responsive to said trip-circuit indication and being also responsive to an indication of the actual presence of a fault, with current-flow into the protected line-section, and means responsive jointly to a failure of the auxiliary means to provide a trip-circuit indication and a failure of an indication of the actual presence of a fault on the transmission-line, for thereafter interposing a slight time-hesitation in the tripping functions of the protected line-section.

8. Protective equipment for a line-section of a transmission-line, comprising line-sectionalizing circuit-interrupter means and relaying means therefor at each end of the line-section being protected, each of said relay means including means for securing a directional response to fault-current power-flow into the protected line-section and also a response to a voltage-change indicating the presence of a fault on the transmission-line without the accompaniment of a corresponding current flow of fault-magnitude, each of said relaying means also including means for providing an indication of the actual presence of a fault on the transmission-line, means for providing an intelligence-communicating channel between the two ends of the protected line-section, auxiliary means associated with said intelligence-communicating channel for selectively cooperating with the aforesaid response of said relaying means at the two ends of the protected line-section, in response to a directional indication, or in response to a voltage-indication of fault without corresponding fault-current, so as to provide a trip-circuit indication, trip-circuit means, at each end, for quickly actuating the circuit-interrupter means at its end of the protected line-section, said trip-circuit means being responsive to said trip-circuit indication and being also responsive to an indication of the actual presence of a fault, with current-flow into the protected line-section, time-hesitation means responsive to an indication of the existence of a fault externally of the protected line-section for introducing a transmission-protective device for thereafter insuring the transmission of a sufficient signalling current, and time-hesitation means responsive jointly to a failure of the auxiliary means to provide a trip-circuit indication and a failure of an indication of the actual presence of a fault on the transmission-line, for introducing a trip-circuit protective device for thereafter interposing a slight time-hesitation in the actuation of the associated line-sectionalizing means.

9. Protective equipment for a line-section of a transmission-line, comprising line-sectionalizing circuit-interrupter means and relaying means therefor at each end of the line-section being protected, each of said relaying means including means for securing a directional response to fault-current power-flow into the protected line-section and also a response to a voltage-change indicating the presence of a fault on the transmission-line without the accompaniment of a corresponding current-flow of fault-magnitude, each of said relaying means also including means for providing an indication of the actual presence of a fault on the transmission-line, means for providing an intelligence-communicating channel between the two ends of the protected line-section, auxiliary means associated with said intelligence-communicating channel for selectively cooperating with the aforesaid responses of said relaying means at the two ends of the protected line-section, in response to a directional indication, or in response to a voltage-indication of fault without corresponding fault-current, so as to provide a trip-circuit indication, trip-circuit means, at each end, for quickly actuating the circuit-interrupter means at its end of the protected line section, said trip-circuit means being responsive to said trip-circuit indication and being also responsive to an indication of the actual presence of a fault, with current-flow into the protected line-section, and means responsive jointly to a failure of the auxiliary means to provide a trip-circuit indication and a failure of an indication of the actual presence of a fault on the transmission-line, for thereafter interposing a slight time-hesitation in the actuation of the circuit-interrupter means at that end.

10. Protective equipment for a line-section of a polyphase transmission-line, comprising line-sectionalizing circuit-interrupter means and relaying means therefor at each end of the line-section being protected, each of said relaying means including a ground-directional relay having a yieldable restraining biasing means, means for producing a power-direction-responsive torque in the actuating direction in response to ground-current-flow into the protected line-section, and means responsive to ground-voltage alone, in the absence of ground-current, for developing a torque in the actuating direction, each of said relaying means further including a ground-fault-indicating relay responsive to the actual presence of a ground-fault on the transmission line, in combination with transmitter means at each end of the line-section being protected for normally transmitting a signalling current, receiver means at each end of the line-section for receiving the signalling current transmitted from the other end, trip-circuit means, at each end, responsive to a cessation of a sufficient received current in said receiver means, and further responsive to an actuation of the ground-directional relay, and to an actuation of the ground-fault-indicating relay, for quickly establishing a trip circuit for actuating the circuit-interrupter means at that end of the protected line-section, means quickly operative in response to an actuation of the ground-directional relay for causing an interruption in the transmission of a sufficient signalling current by the transmitter means at that end of the protected line-section, and means responsive jointly to a failure of the receiver to receive a sufficient signalling current and a failure of an indication of the actual presence of a fault on the transmission-line, for thereafter interposing a slight time-hestitation in the tripping functions of the protected line-section.

11. Protective equipment for a line-section of a transmission-line, comprising line-sectionalizing circuit-interrupter means and relaying means therefor at each end of the line-section being protected, each of said relaying means including a phase-directional relay element having a yieldable actuating biasing means tending to actuate the relay, means for developing a voltage-restraint torque responsive to phase-to-phase line-voltages of the transmission-line tending to restrain the actuation of the relay, and means for developing a phase-to-phase power-directional torque which tends to actuate the relay in response to phase-to-phase fault-current-flow into the protected line-section, each of said relaying means further including phase-to-phase fault-responsive means responsive to the actual presence of a phase-to-phase fault on the transmission-line, in combination with transmitter means at each end of the line-section being protected for normally transmitting a signalling current, receiver means at each end of the line-section for receiving the signalling current transmitted from the other end, trip-circuit means, at each end, responsive to a cessation of a sufficient received current in said receiver means, and further responsive to an actuation of the phase-directional element, and to an actuation of the phase-to-phase fault-responsive means, for quickly establishing a trip-circuit for actuating the circuit-interrupter means at that end of the protected line-section, means quickly operative in response to an actuation of the phase-directional element for causing an interruption in the transmission of a sufficient signalling current by the transmitter means at that end of the protected line-section, and means responsive jointly to a failure of the receiver to receive a sufficient signalling current and a failure of an indication of the actual presence of a fault on the transmission-line, for thereafter interposing a slight time-hesitation in the tripping functions of the protected line-section.

12. Protective equipment for a line-section of a three-phase transmission-line, comprising line-sectionalizing circuit-interrupter means and relaying means therefor at each end of the line-section being protected, each of said relaying means including a phase-directional relay element having an actuating spring tending to actuate the relay, means for developing a voltage-restraint torque responsive to the area of the delta-voltage triangle of the transmission line-voltages tending to restrain the actuation of the relay, and three separate phase-to-phase power-directional torque-producing means responsive to the direction of power-flow in the three respective delta-phases of the protected line-section for developing torques in such direction as to tend to actuate the relay in response to delta-phase fault-current-flow into the protected line-section, each of said relaying means further including phase-to-phase fault-responsive means responsive to the presence of a phase-to-phase fault on the transmission-line, in combination with transmitter means at each end of the line-section being protected for normally transmitting a signalling current, receiver means at each end of the line-section for receiving the signalling current transmitted from the other end, trip-circuit means, at each end, responsive to a cessation of a sufficient received current in said receiver means, and further responsive to an actuation of the phase-directional element, and to an actuation of the phase-to-phase fault-responsive means for quickly establishing a trip circuit for actuating the circuit-interrupter means at that end of the protected line-section, means quickly operative in response to an actuation of the phase-directional relay for causing an interruption in the transmission of a sufficient signalling current by the transmitter-means at that end of the protected line-section, and means responsive jointly to a failure of the receiver to receive a sufficient signalling current and a failure of an indication of the actual presence of a fault on the transmission-line, for thereafter interposing a slight time-hesitation in the tripping functions of the protected line-section.

13. Protective equipment for a line-section of a polyphase synchronous transmission-line subject to both ground faults and phase-to-phase faults, comprising line-sectionalizing circuit-interrupter means and relaying means therefor at each end of the line-section being protected, each of said relaying means including a quick-acting phase directionally responsive relaying means responsive to both power-in and power-out phase-to-phase faults, a quick-acting ground directionally responsive relaying means responsive to both power-in and power-out ground faults, said phase and ground directionally responsive means being associated with means for also giving a power-in response to a voltage-change which indicates the presence of a fault on the transmission-line under conditions when there is no corresponding current-indication of a fault, said relaying means also including a plurality of different fault-indicating quick-acting relaying means for responding to the presence of different types of fault somewhere on the transmission-line, a communicating-channel between the two ends of the protected line-section, transmitter means at each end of the protected line-section for normally transmitting a signal current through said communicating-channel, receiver means at each end of the protected line-section for receiving the signalling current transmitted from the other end, trip-circuit means quickly operative at each end of the protected line-section for actuating its associated line-sectionalizing means, said trip-circuit means being responsive to a cessation of a sufficient received current in said receiver means, and being further responsive to either a joint internal-fault indication of said phase directionally responsive relaying means and an indication of a corresponding fault-indicating relaying means, or a joint internal-fault indication of said ground directionally responsive relaying means and an indication of a corresponding fault-indicating relaying means, transmitter-controlling means at each end of the protected line-section for causing a quick cessation of the transmission of a sufficient signalling current by said transmitter in response to either a directional indication of fault-power flowing into the protected line-section or a voltage-indication of a fault without a corresponding current-indication of a fault, time-hesitation means operative, after its operation, to thereafter interpose a slight time-hesitation in the tripping functions of the protected line-section, and means for operating said time-hesitation means either in response to a power-out fault-power directional indication or in joint response to a failure of the receiver to receive a sufficient signalling current and a failure of an indication of the actual presence of a fault on the transmission-line.

14. Protective equipment for a line-section of a polyphase synchronous transmission-line subject to both ground faults and phase-to-phase faults, comprising line-sectionalizing circuit-interrupter means and relaying means therefor at each end of the line-section being protected, each of said relaying means including a quick-acting phase directionally responsive relaying means responsive to both power-in and power-out phase-to-phase faults, a quick-acting ground directionally responsive relaying means responsive to both power-in and power-out ground faults, said phase and ground directionally responsive means being associated with means for also giving a power-in response to a voltage-change which indicates the presence of a fault on the transmission-line under conditions when there is no corresponding current-indication of a fault, said relaying means also including a plurality of different fault-indicating quick-acting relaying means for responding to the presence of different types of fault somewhere on the transmission-line, a communicating-channel between the two ends of the protected line-section, transmitter means at each end of the protected line-section for normally transmitting a signal current through said communicating-channel, receiver means at each end of the protected line-section for receiving the signalling current transmitted from the other end, trip-circuit means quickly operative at each end of the protected line-section for actuating its associated line-sectionalizing means, said trip-circuit means being responsive to a cessation of a sufficient received current in said receiver means, and being further responsive to either a joint internal-fault indication of said phase directionally responsive relaying means and an indication of a corresponding fault-indicating relaying means, or a joint internal-fault indication of said ground directionally responsive relaying means and an indication of a corresponding fault-indicating relaying means, transmitter-controlling means at each end of the protected line-section for causing a quick cessation of the transmission of a sufficient signalling current by said transmitter in response to either a directional indication of fault-power flowing into the protected line-section or a voltage-indication of a fault without a corresponding current-indication of a fault, a transmitter-protective device for insuring the transmission of a sufficient signalling current, said transmitter-protective device being sluggish in its drop-out action, means for actuating said transmitter-protective device in response to a power-out fault-power directional indication, a trip-circuit protective device operative, after its operation, to thereafter interpose a slight time-hesitation in the actuation of the associated line-sectionalizing means, and means for operating said trip-circuit protective device in joint response to a failure of the receiver to receive a sufficient signalling current and a failure of said fault-indicating means to indicate the actual presence of a fault on the transmission-line.

15. Protective equipment for a transmission line-section, comprising line-sectionalizing circuit-interrupter means and relaying means therefor at each end of the line-section being protected, each of said relaying means including quick relaying means directionally responsive to certain faults, and also fault-indicating relaying means responsive to a voltage-indication of a fault without a material corresponding fault current, means for providing an intelligence-communicating channel between the two ends of the line-section being protected, auxiliary means associated with said intelligence-communicating channel for selectively cooperating with the directionally responsive means at the two ends of the protected line-section so as to respond to conditions of internal faults somewhere between the two ends of the particular line-section being protected for quickly actuating the circuit-interrupter means at both ends of the protected line-section, and time-hesitation means responsive to said fault-indicating means for thereafter introducing an impediment to the immediate quick actuation of said circuit-interrupter means.

16. Protective equipment for a transmission line-section, comprising line-sectionalizing circuit-interrupter means and relaying means therefor at each end of the line-section being protected, each of said relaying means including quick relaying means directionally responsive to fault power-flow into the protected line-section, and also fault-indicating relaying means responsive to a voltage-indication of a fault without a material corresponding fault current, a communicating channel between the two ends of the line-section being protected, a transmitter means disposed at each end of the line-section normally continuously transmitting a signalling current through said communicating channel to the other end of the line-section, transmitter-controlling means responsive to an indication of said directional relaying means or of said fault-indicating relaying means for causing said transmitter to cease transmitting effective signalling current, a receiver disposed at each end of the line-section and associated with said communication channel, means at each end, responsive to a failure of the receiver to receive a sufficient signalling current, and further responsive to the actual presence of a fault on the transmission-line, and responsive also to the direction of power-current flow into the line-section being protected, for quickly energizing a control circuit for the circuit-interrupter means, and time-hesitation means responsive to said fault-indicating means for thereafter interposing a slight time-hesitation in the actuation of the associated line-sectionalizing means.

LESTER B. LE VESCONTE.